US011829128B2

(12) United States Patent
Hu et al.

(10) Patent No.: US 11,829,128 B2
(45) Date of Patent: Nov. 28, 2023

(54) PERCEPTION SYSTEM DIAGNOSIS USING PREDICTED SENSOR DATA AND PERCEPTION RESULTS

(71) Applicant: GM GLOBAL TECHNOLOGY OPERATIONS LLC, Detroit, MI (US)

(72) Inventors: Yao Hu, Sterling Heights, MI (US); Wei Tong, Troy, MI (US); Wen-Chiao Lin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 611 days.

(21) Appl. No.: 16/661,126

(22) Filed: Oct. 23, 2019

(65) Prior Publication Data
US 2021/0124344 A1   Apr. 29, 2021

(51) Int. Cl.
| | |
|---|---|
| G05B 23/02 | (2006.01) |
| G07C 5/08 | (2006.01) |
| G05D 1/00 | (2006.01) |
| H04L 67/12 | (2022.01) |
| G07C 5/00 | (2006.01) |
| G06V 20/56 | (2022.01) |

(Continued)

(52) U.S. Cl.
CPC ....... *G05B 23/024* (2013.01); *G05B 23/0283* (2013.01); *G05D 1/0055* (2013.01); *G05D 1/0088* (2013.01); *G05D 1/0094* (2013.01); *G06F 18/217* (2023.01); *G06V 10/993* (2022.01); *G06V 20/56* (2022.01); *G07C 5/008* (2013.01); *G07C 5/0808* (2013.01); *H04L 67/12* (2013.01)

(58) Field of Classification Search
CPC ............. G06V 10/82; G06V 20/56; G06T 2207/20084; G06T 7/0002; G05B 23/0259; G05B 23/0283
See application file for complete search history.

(56) References Cited

U.S. PATENT DOCUMENTS

| | | | |
|---|---|---|---|
| 7,099,510 B2 | 8/2006 | Jones et al. | |
| 9,739,881 B1 | 8/2017 | Pavek et al. | |

(Continued)

FOREIGN PATENT DOCUMENTS

| | | |
|---|---|---|
| CN | 107628036 A | 1/2018 |
| CN | 108466623 A | 8/2018 |

(Continued)

OTHER PUBLICATIONS

English translation of Nakamura from JPlatPat. (Year: 1996).*

(Continued)

*Primary Examiner* — Vivek D Koppikar
*Assistant Examiner* — Joan T Goodbody (57) ABSTRACT

A perception system includes a perception module configured to capture first sensor data that includes data from at least one of an external sensor and a camera captured in a first period, a prediction module configured to receive the first sensor data, generate, based on the first sensor data, predicted sensor data for a second period subsequent to the first period, receive second sensor data for the second period, and output results of a comparison between the predicted sensor data and the second sensor data, and a diagnostic module configured to selectively identify a fault in the perception system based on the results of the comparison.

18 Claims, 6 Drawing Sheets

(51) Int. Cl.
*G06F 18/21* (2023.01)
*G06V 10/98* (2022.01)

(56) References Cited

U.S. PATENT DOCUMENTS

| | | | |
|---|---|---|---|
| 9,760,806 B1* | 9/2017 | Ning | G06V 10/454 |
| 10,282,623 B1 | 5/2019 | Ziyaee et al. | |
| 10,339,390 B2 | 7/2019 | Shen | |
| 10,373,000 B2 | 8/2019 | Tong et al. | |
| 10,471,829 B2 | 11/2019 | Yellambalase et al. | |
| 10,606,274 B2 | 3/2020 | Yalla et al. | |
| 10,664,722 B1 | 5/2020 | Sharma et al. | |
| 10,684,626 B1 | 6/2020 | Martin | |
| 10,713,570 B1 | 7/2020 | Hazard | |
| 2002/0102024 A1 | 8/2002 | Jones et al. | |
| 2006/0204035 A1 | 9/2006 | Guo et al. | |
| 2007/0183651 A1 | 8/2007 | Comaniciu et al. | |
| 2010/0097458 A1 | 4/2010 | Zhang et al. | |
| 2010/0198442 A1* | 8/2010 | Appelman | G05D 1/02 701/25 |
| 2012/0083923 A1* | 4/2012 | Matsumoto | G05D 1/0274 901/1 |
| 2012/0106800 A1 | 5/2012 | Khan et al. | |
| 2015/0102955 A1* | 4/2015 | O'Dea | G01S 7/41 342/70 |
| 2015/0371109 A1 | 12/2015 | Vo et al. | |
| 2016/0364620 A1* | 12/2016 | Akiyama | H04N 7/188 |
| 2017/0034502 A1 | 2/2017 | Aurongzeb et al. | |
| 2017/0135541 A1* | 5/2017 | Kwak | B25J 5/007 |
| 2017/0136631 A1 | 5/2017 | Li et al. | |
| 2017/0169627 A1 | 6/2017 | Kim et al. | |
| 2017/0301109 A1 | 10/2017 | Chan et al. | |
| 2018/0005407 A1 | 1/2018 | Browning et al. | |
| 2018/0053102 A1* | 2/2018 | Martinson | G08G 1/09623 |
| 2018/0181793 A1 | 6/2018 | Ariga et al. | |
| 2018/0192035 A1 | 7/2018 | Dabeer et al. | |
| 2018/0275682 A1* | 9/2018 | Lavretsky | G05D 1/0875 |
| 2018/0293552 A1 | 10/2018 | Zhang et al. | |
| 2018/0300567 A1 | 10/2018 | Qin et al. | |
| 2019/0064810 A1 | 2/2019 | Jiang et al. | |
| 2019/0129431 A1 | 5/2019 | Yalla et al. | |
| 2019/0132543 A1 | 5/2019 | Maeda et al. | |
| 2019/0236865 A1 | 8/2019 | Mercep et al. | |
| 2019/0242711 A1 | 8/2019 | Ingersoll et al. | |
| 2020/0035195 A1 | 1/2020 | Maeng et al. | |
| 2020/0082621 A1 | 3/2020 | Son et al. | |
| 2020/0097604 A1 | 3/2020 | Lee et al. | |
| 2020/0134896 A1 | 4/2020 | Chang et al. | |

FOREIGN PATENT DOCUMENTS

| | | |
|---|---|---|
| CN | 109421739 A | 3/2019 |
| JP | H08279093 A * | 10/1996 |

OTHER PUBLICATIONS

U.S. Appl. No. 16/139,782, filed Sep. 24, 2018, Hu et al.
U.S. Appl. No. 16/527,561, filed Jul. 31, 2019, Hu et al.
U.S. Appl. No. 16/541,421, filed Aug. 15, 2019, Hu.
Ramanagopal, M. S. et al. "Failing to Learn: Autonomously Identifying Perception Failures for Self-driving Cars", IEEE Robotics and Automation Letters 2018; 8 pgs.
Mahjourian, R. et al. "Geometry-Based Next Frame Prediction from Monocular Video", 2017 IEEE Intelligent Vehicles Symposium, https://arxiv.org/abs/1609.06377; 8 pgs.
Chinese Search Report for corresponding Chinese Application No. 2020111489604 dated Aug. 28, 2023.

* cited by examiner

PERCEPTION SYSTEM DIAGNOSIS USING PREDICTED SENSOR DATA AND PERCEPTION RESULTS

CROSS-REFERENCE TO RELATED APPLICATIONS

The present disclosure is related by subject matter to U.S. patent application Ser. No. 16/527,561, filed on Jul. 31, 2019, and U.S. patent application Ser. No. 16/541,421, filed on Aug. 15, 2019. The entire disclosures of the applications referenced above are incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to perception systems of vehicles and more particularly to systems and methods for diagnosing faults in perception systems of vehicles.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward facing cameras, rear facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

A perception system includes a perception module configured to capture first sensor data that includes data from at least one of an external sensor and a camera captured in a first period, a prediction module configured to receive the first sensor data, generate, based on the first sensor data, predicted sensor data for a second period subsequent to the first period, receive second sensor data for the second period, and output results of a comparison between the predicted sensor data and the second sensor data, and a diagnostic module configured to selectively identify a fault in the perception system based on the results of the comparison.

In other features, the first sensor data further includes historical sensor data captured in periods prior to the first period.

In other features, the prediction module is configured to generate the predicted sensor data further based on the historical sensor data.

In other features, the results of the comparison include a numerical representation of a difference between the predicted sensor data and the second sensor data.

In other features, the prediction module includes a convolutional long short term memory network.

In other features, the perception module is further configured to generate perception results based on the second sensor data, wherein the perception results identify features contained in the second sensor data.

In other features, the prediction module is configured to generate predicted perception results corresponding to the predicted sensor data.

In other features, the prediction module is configured to compare the predicted perception results to the perception results and provide results of the comparison between the predicted perception results and the perception results to the diagnostic module.

In other features, the diagnostic module is configured to selectively identify the fault in the perception system further based on the results of the comparison between the predicted perception results and the perception results.

In other features, the fault corresponds to a fault in at least one of the external sensor and the camera.

A method of operating a perception system includes capturing first sensor data, wherein the first sensor data includes data from at least one of an external sensor and a camera captured in a first period, generating, based on the first sensor data, predicted sensor data for a second period subsequent to the first period, receiving second sensor data for the second period, outputting results of a comparison between the predicted sensor data and the second sensor data and selectively identifying a fault in the perception system based on the results of the comparison.

In other features, the first sensor data further includes historical sensor data captured in periods prior to the first period.

In other features, the method includes generating the predicted sensor data further based on the historical sensor data.

In other features, the results of the comparison include a numerical representation of a difference between the predicted sensor data and the second sensor data.

In other features, the method includes generating the predicted sensor data using a convolutional long short term memory network.

In other features, the method includes generating perception results based on the second sensor data, wherein the perception results identify features contained in the second sensor data.

In other features, the method includes generating predicted perception results corresponding to the predicted sensor data.

In other features, the method includes comparing the predicted perception results to the perception results and selectively identifying the fault in the perception system further based on the results of the comparison between the predicted perception results and the perception results.

In other features, the fault corresponds to a fault in at least one of the external sensor and the camera.

A perception system for a vehicle includes at least one of an external sensor and a camera arranged to provide data corresponding to an environment surrounding the vehicle, a perception module configured to capture first sensor data that includes the data from the at least one of the external sensor and the camera captured in a first period, capture second sensor data that includes the data from the at least one of the external sensor and the camera captured in a second period subsequent to the first period, and generate perception results, based on the second sensor data, that identify features contained in the second sensor data. The perception system further includes a prediction module configured to receive the first sensor data, the second sensor data, and the perception results, generate, based on the first sensor data, predicted sensor data for the second period, generate, based on the predicted sensor data, predicted perception results, and output results of a first comparison between the predicted sensor data and the second sensor data and a second comparison between the predicted perception results and the perception results, and a diagnostic module configured to selectively identify a fault in the perception system based on the results of the first comparison and the second comparison.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include a perception system that perceives objects located around the vehicle based on data from external cameras and sensors. Examples of external cameras include forward facing cameras, rear facing cameras, and side facing cameras. External sensors include radar sensors, light detection and ranging (LIDAR) sensors, and other types of sensors.

A prediction module and a diagnostic module according to the principles of the present disclosure are respectively configured to predict sensor data and perception results and selectively diagnose faults associated with the perception system of a vehicle based on comparisons of the predicted and actual sensor data and perception results. The predicted sensor data and perception results may be based on historical sensor data. For example, neural networks may use historical raw data to predict the sensor data and perception results.

Figure 1:
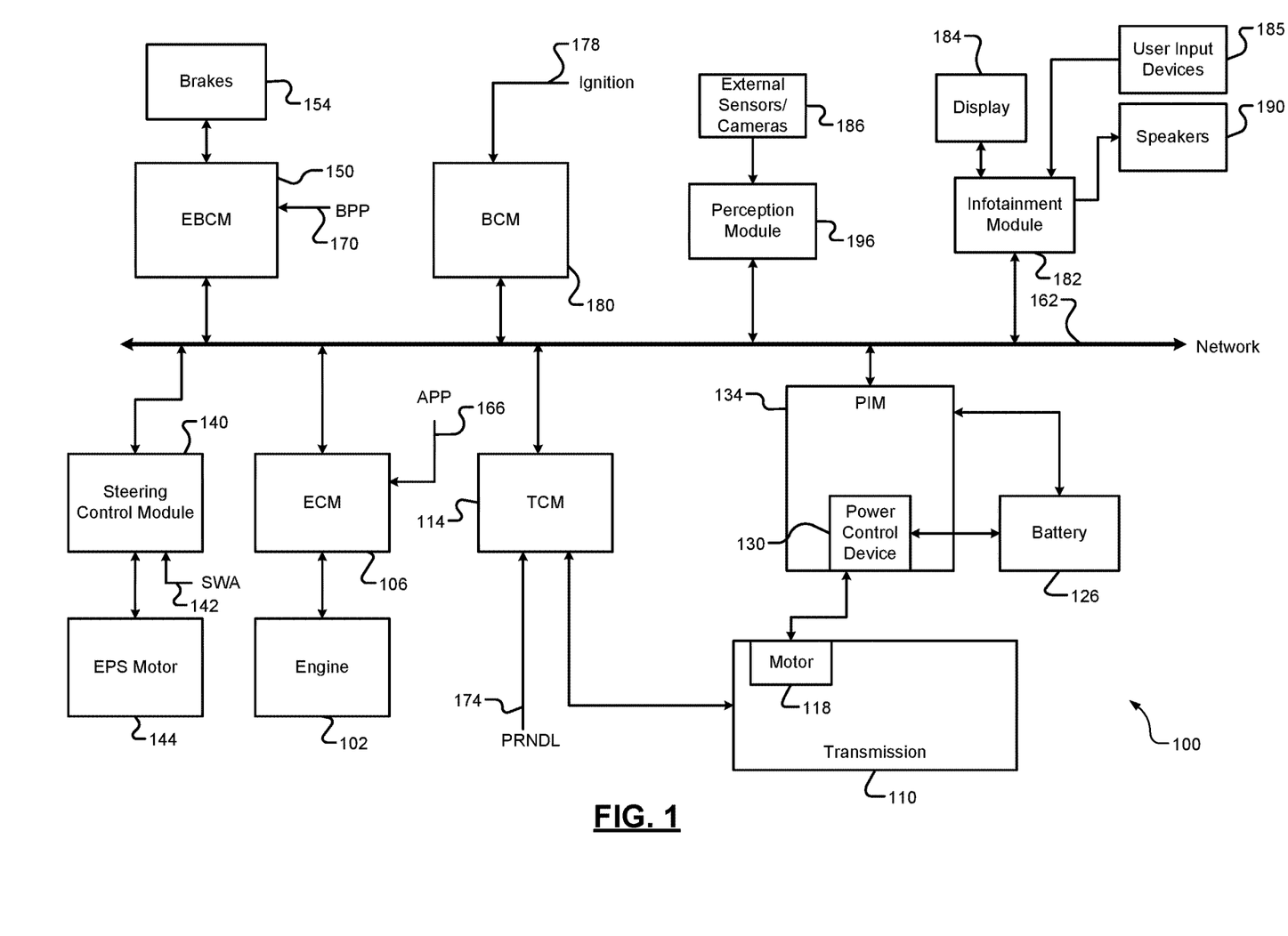
FIG. 1 is a functional block diagram of an example vehicle system.

Referring now to FIG. 1, a functional block diagram of an example vehicle system 100 is presented. While a vehicle system 100 for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system 100 may also include an infotainment module 182. The infotainment module 182 controls what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc. The infotainment module 182 may also generate output via one or more other devices. For example, the infotainment module 182 may output sound via one or more speakers 190 of the vehicle.

The vehicle may include a plurality of external sensors and cameras, generally illustrated in FIG. 1 by 186. One or more actions may be taken based on input from the external sensors and cameras 186. For example, the infotainment module 182 may display video, various views, and/or alerts on the display 184 via input from the external sensors and cameras 186.

As another example, based on input from the external sensors and cameras 186, a perception module 196 perceives objects around the vehicle and locations of the objects relative to the vehicle. The ECM 106 may adjust torque output of the engine 102 based on input from the perception module 196. Additionally or alternatively, the PIM 134 may control power flow to and/or from the electric motor 118 based on input from the perception module 196. Additionally or alternatively, the EBCM 150 may adjust braking based on input from the perception module 196. Additionally or alternatively, the steering control module 140 may adjust steering based on input from the perception module 196. The vehicle system 100 according to the principles of the present disclosure is configured to predict sensor data and perception results and perform diagnostics based on a comparison between the predicted sensor data and perception results and actual sensor data and perception results as described below in more detail.

The vehicle may include one or more additional control modules that are not shown, such as a chassis control module, a battery pack control module, etc. The vehicle may omit one or more of the control modules shown and discussed.

Figure 2:
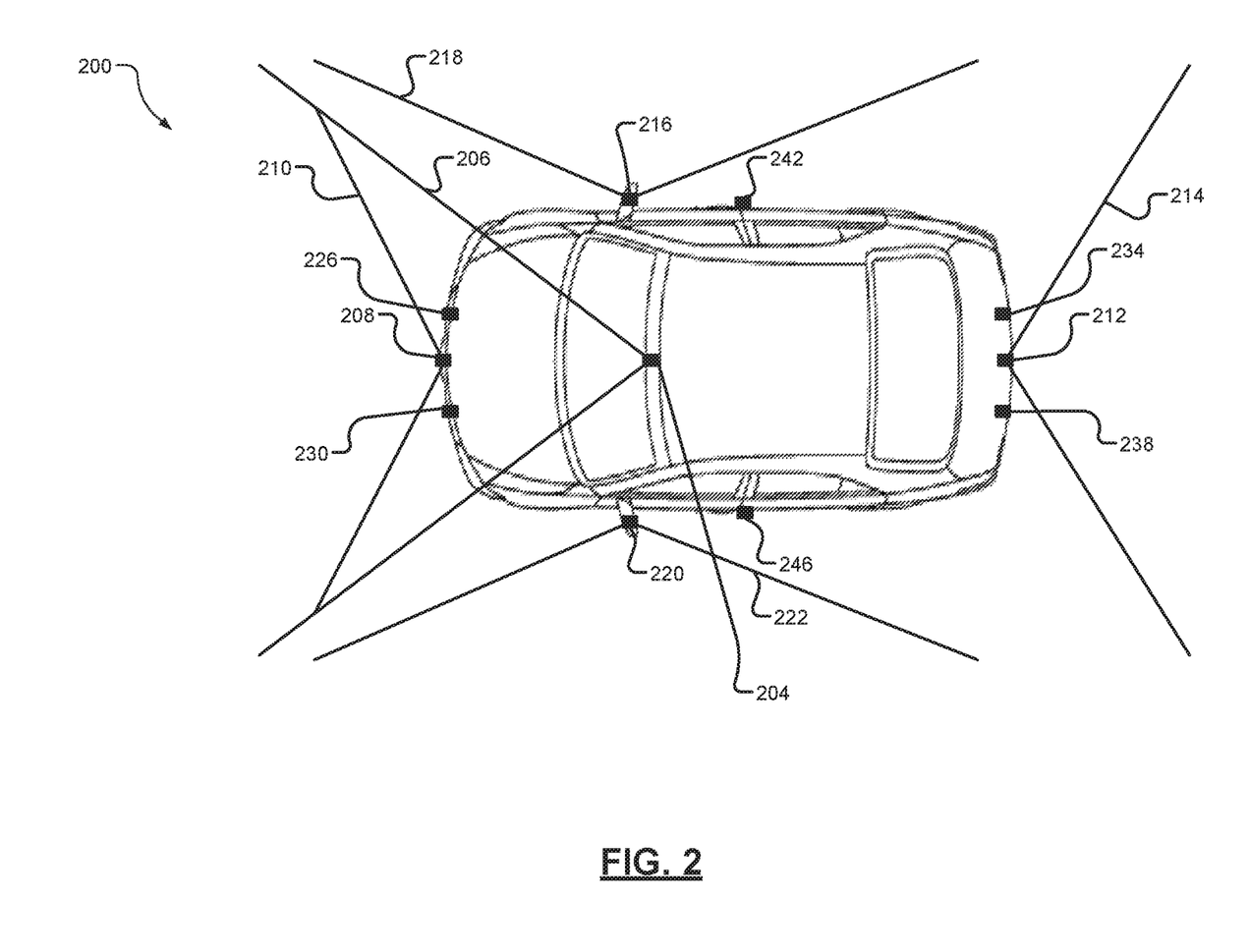
FIG. 2 is a functional block diagram of a vehicle including various external cameras and sensors.

Referring now to FIG. 2, a functional block diagram of a vehicle 200 implementing the vehicle system 100 of FIG. 1 and including examples of external sensors and cameras (e.g., corresponding to the external sensors and cameras 186 as described above in FIG. 1) is presented. The external sensors and cameras 186 include various cameras positioned to capture images and video outside of (external to) the vehicle 200 and various types of sensors measuring parameters outside of (external to the vehicle 200). For example, a forward facing camera 204 captures images and video of images within a predetermined field of view (FOV) 206 in front of the vehicle 200.

A front camera 208 may also capture images and video within a predetermined FOV 210 in front of the vehicle 200. The front camera 208 may capture images and video within a predetermined distance of the front of the vehicle 200 and may be located at the front of the vehicle 200 (e.g., in a front fascia, grille, or bumper). The forward facing camera 204 may be located more rearward, however, such as with a rear view mirror at a windshield of the vehicle 200. The forward facing camera 204 may not be able to capture images and video of items within all of or at least a portion of the predetermined FOV of the front camera 208 and may capture images and video that is greater than the predetermined distance of the front of the vehicle 200. In various implementations, only one of the forward facing camera 204 and the front camera 208 may be included.

A rear camera 212 captures images and video within a predetermined FOV 214 behind the vehicle 200. The rear camera 212 may capture images and video within a predetermined distance behind vehicle 200 and may be located at the rear of the vehicle 200, such as near a rear license plate.

A right camera 216 captures images and video within a predetermined FOV 218 to the right of the vehicle 200. The right camera 216 may capture images and video within a predetermined distance to the right of the vehicle 200 and may be located, for example, under a right side rear view mirror. In various implementations, the right side rear view mirror may be omitted, and the right camera 216 may be located near where the right side rear view mirror would normally be located.

A left camera 220 captures images and video within a predetermined FOV 222 to the left of the vehicle 200. The left camera 220 may capture images and video within a predetermined distance to the left of the vehicle 200 and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 may additionally or alternatively include various other types of sensors, such as ultrasonic (e.g., radar) sensors. For example, the vehicle 200 may include one or more forward facing ultrasonic sensors, such as forward facing ultrasonic sensors 226 and 230, one or more rearward facing ultrasonic sensors, such as rearward facing ultrasonic sensors 234 and 238. The vehicle 200 may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle 200.

The external sensors and cameras 186 may additionally or alternatively include one or more other types of sensors, such as one or more sonar sensors, one or more radar sensors, and/or one or more light detection and ranging (LIDAR) sensors.

Figure 3:
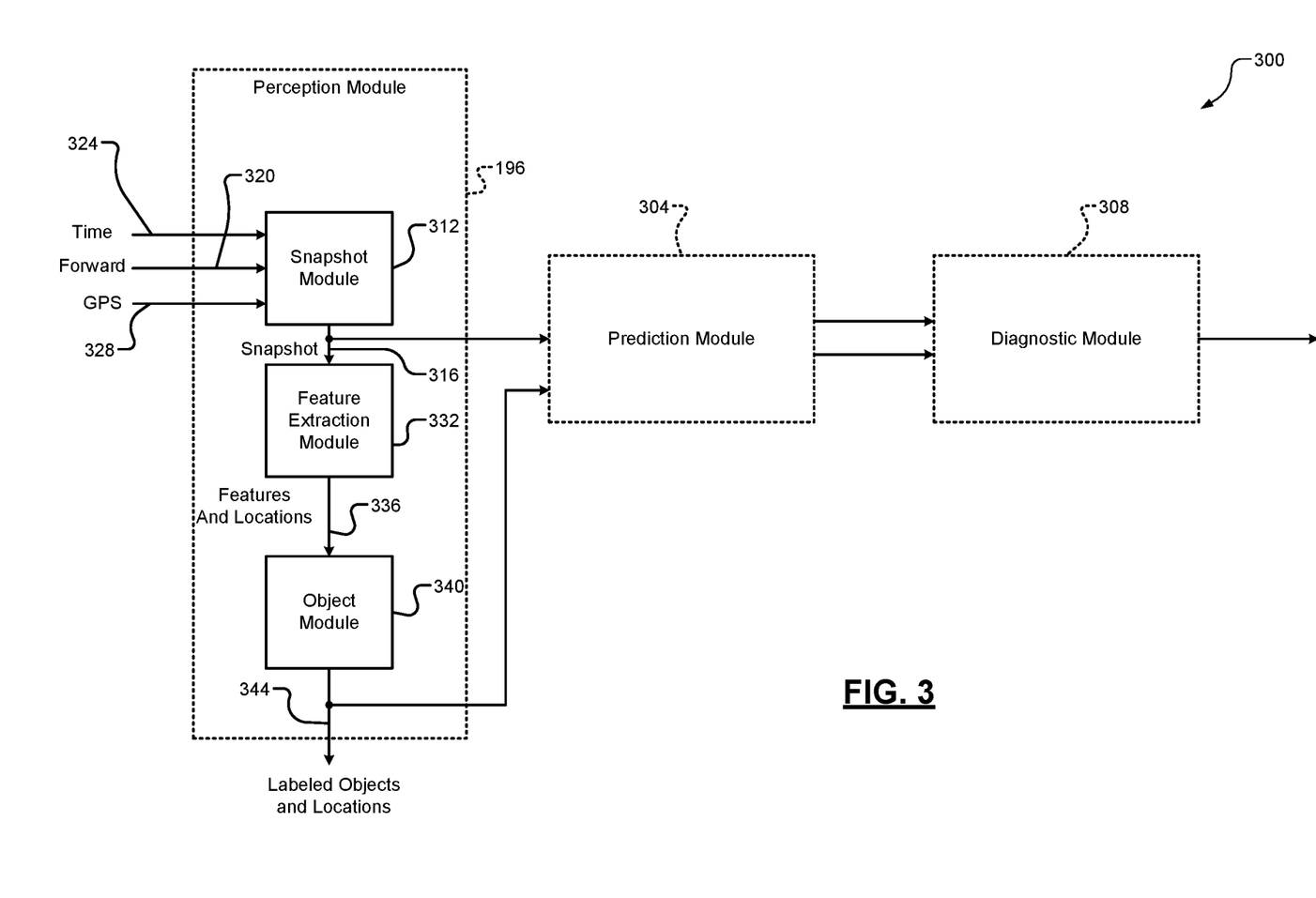
FIG. 3 is a functional block diagram of an example implementation of a perception module and a diagnostic module.

FIG. 3 is a functional block diagram of an example implementation of a perception system 300 according to the principles of the present disclosure. The perception system 300 includes the perception module 196, a prediction module 304, and a diagnostic module 308. The diagnostic module 308 selectively diagnoses faults associated with the perception module 196 and the external sensors and cameras 186.

The perception module 196 includes a snapshot module 312 configured to capture snapshots 316 of data (e.g., sensor data) including data from one of the external sensors and cameras 186. The snapshot module 312 may capture a new snapshot each predetermined period. The snapshots 316 may include a forward facing image 320 captured using the forward facing camera 204, a time 324 (and date; e.g., a timestamp) that the forward facing image 320 was captured, and a location 328 of the vehicle 200 at the time that the forward facing image 320 was captured. While the example of the snapshots 316 including the forward facing image 320 will be discussed, the present application is also applicable to data from other ones of the external sensors and cameras 186. A clock may track and provide the (present) time 324. A global position system (GPS) may track and provide the (present) location 328. Snapshots may be obtained and the following may be performed for each one of the external sensors and cameras 186.

A feature extraction module 332 identifies features and locations 336 of the features in the forward facing image 320 of the snapshots 316. Examples of features include, for example, edges of objects, shapes of objects, etc. The feature extraction module 332 may identify the features and locations using one or more feature extraction algorithms, such as a scale invariant feature transform (SIFT) algorithm, a speeded up robust features (SURF) algorithm, and/or one or more other feature extraction algorithms.

An object module 340 labels objects in the forward facing image 320 of the snapshots 316 based on the features identified in the forward facing image 320 of the snapshots 316. For example, the object module 340 may identify shapes in the forward facing image 320 based on the shapes of the identified features and match the shapes with predetermined shapes of objects stored in a database. The object module 340 may attribute the names or code words of the predetermined shapes matched with shapes to the shapes of the identified features. The object module 340 outputs perception results, such as labeled objects and locations 344. As another example, a deep neural network module may implement the functionality of both the feature extraction module 332 and the object module 340. The first a few layers in such a deep neural network module perform the function of feature extraction, and then pass the features to the rest of the layers in the deep neural network module to perform the function of object labeling. A vehicle may have more than one feature extraction module independent from each other.

One or more actions may be taken based on the labeled objects and locations 344. For example, the infotainment module 182 may display video, various views, and/or alerts on the display 184. As another example, the ECM 106 may adjust torque output of the engine 102 based on the labeled objects and locations 344. Additionally or alternatively, the PIM 134 may control power flow to and/or from the electric motor 118 based on the labeled objects and locations 344. Additionally or alternatively, the EBCM 150 may adjust braking based on the labeled objects and locations 344. Additionally or alternatively, the steering control module 140 may adjust steering based on the labeled objects and locations 344.

The prediction module 304 also receives sensor data (e.g., the snapshots 316) and perception results (e.g., the labeled objects and locations 344) from the perception module 196 for a first period. The prediction module 304 is configured to predict sensor data and perception results (e.g., which may be referred to as a predicted current or next frame of data) for a second period and compare the predicted sensor data and perception results to actual sensor data and perception results for the second period. The diagnostic module 308 is configured to perform diagnostics based on a comparison between the predicted sensor data and perception results and the actual sensor data and perception results as described below in more detail.

All or parts of the prediction module 304 and the diagnostic module 308 may be implemented within the vehicle 200. Alternatively, all or parts of the prediction module 304 and the diagnostic module 308 may be located remotely, such as in a remote server or cloud computing system. If all or parts of the prediction module 304 and the diagnostic module 308 are located remotely, the vehicle 200 may include one or more transceivers that transmit data to and from the vehicle 200 wirelessly, such as via a cellular transceiver, a WiFi transceiver, a satellite transceiver, and/or another suitable type of wireless communication.

Figure 4:
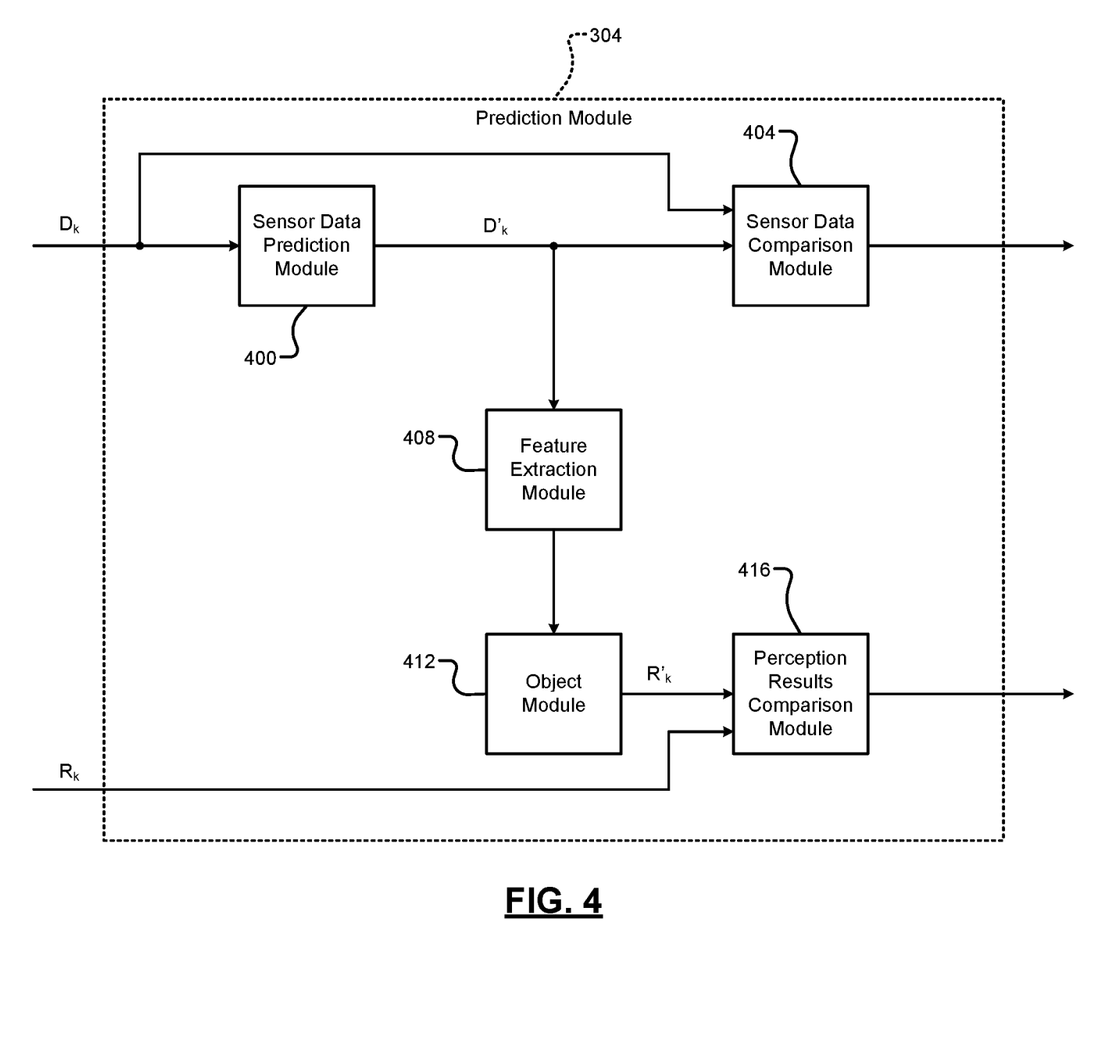
FIG. 4 is a functional block diagram of an example prediction module.

Referring now to FIG. 4, the prediction module 304 is shown in more detail. The prediction module 304 includes a sensor data prediction module 400 configured to receive sensor data including current sensor data ($D_k$) and historical sensor data ($D_{k-1}$, $D_{k-2}$, etc.), where k identifies a time period corresponding to the capture of the sensor data. Subsequent to receiving the current sensor data $D_k$, the sensor data prediction module 400 also receives next sensor data $D_{k+1}$. In other words, the sensor data includes multiple captured frames or snapshots of the sensor data. The current sensor data corresponds to captured actual sensor data. In some examples, the sensor data prediction module 400 may be configured to store the historical sensor data and/or retrieve the historical sensor data from a storage location (e.g., a buffer, a remote server, etc.).

The sensor data prediction module 400 outputs predicted sensor data ($D'_k$) based on the historical sensor data (e.g., $D_{k-1}$, $D_{k-2}$, $D_{k-3}$, etc., corresponding to buffered samples of $D_k$ in prior periods). For example, the sensor data prediction module 400 calculates the predicted sensor data based on one or more frames of the historical sensor data as described in more detail in FIG. 5. The predicted sensor data corresponds to predicted sensor data subsequent to a latest historical sensor data frame (e.g., $D_{k-1}$). A sensor data comparison module 404 receives and compares the predicted sensor data D'k and the actual current sensor data $D_k$ and outputs a comparison result (e.g., to the diagnostic module 308) accordingly. For example, the comparison result corresponds to a numerical representation of a difference between the predicted sensor data D'k and the actual sensor data $D_k$.

The predicted sensor data is also provided to a feature extraction module 408. For example, the feature extraction module 408 may be configured similar to the feature extraction module 332 and identifies features and locations of features indicated in the predicted sensor data. Similarly, an object module 412 (e.g., configured in a manner similar to the object module 340) labels objects indicated in the predicted sensor data based on the features identified by the feature extraction module 408. In this manner, the object module 412 outputs predicted perception results $R'_k$.

A perception results comparison module 416 receives and compares the predicted perception results $R'_k$ and actual perception results $R_k$ and outputs a comparison result (e.g., to the diagnostic module 308) accordingly. In other words, the predicted perception results $R'_k$ correspond to prediction results as calculated in accordance with the predicted sensor data. Conversely, the actual perception results $R_k$ correspond to the actual predication results as calculated for the actual sensor data for a same period. Accordingly, the comparison result output by the perception results comparison module 416 corresponds to a difference between perception results calculated for the actual sensor data and perception results calculated for the predicated sensor data. For example, the comparison result corresponds to a numerical representation of the difference between the predicted perception results $R'_k$ and the actual perception results $R_k$.

Figure 5:
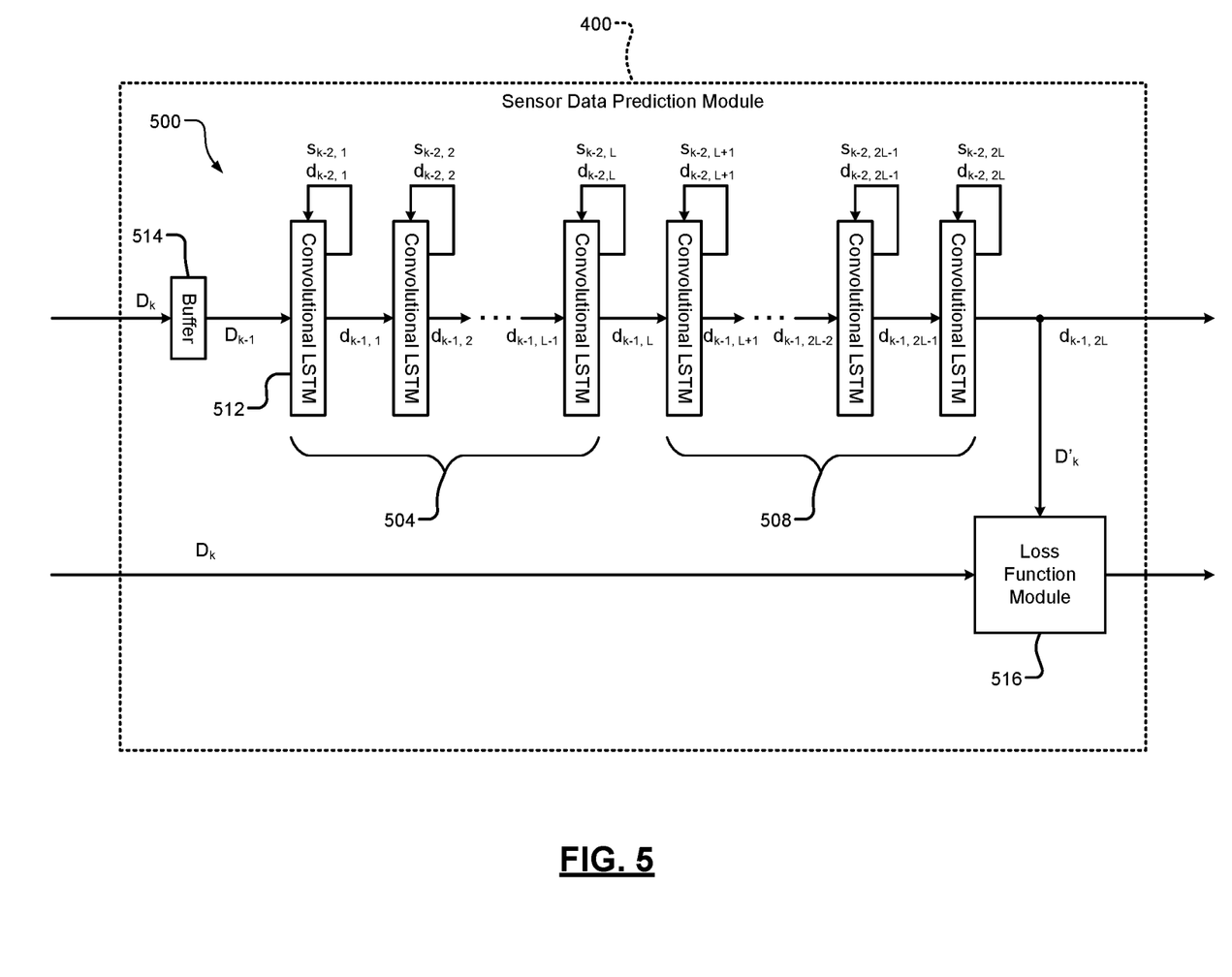
FIG. 5 is a functional block diagram of an example sensor data prediction module.

Referring now to FIG. 5, the sensor data prediction module 400 is shown in more detail. The sensor data prediction module 400 includes a neural or machine learning network, such as a convolutional long short term memory (LSTM) network 500 comprised of a plurality of convolutional neural network (CNN) layers. For example, the convolutional LSTM network 500 includes an encoder section 504 and a decoder section 508. Each of the encoder section 504 and the decoder section 508 includes a respective plurality of convolutional LSTM layers 512. For example only, each of the encoder section 504 and the decoder section 508 includes L of the convolutional LSTM layers 512 for a total of 2L of convolutional LSTM layers 512.

The encoder section 504 (e.g., a first convolutional LSTM layer 512 of the encoder section 504) receives sensor data $D_{k-1}$ (e.g., where k, k-1, etc. correspond to a time period or timestamp) as an input. For example, sensor data from respective periods may be provided to a buffer 514, which in turn outputs the sensor data to the encoder section 504. Each of the convolutional LSTM layers 512 of the encoder section 504 provides an output $(d_{k-1, 1} \ldots d_{k-1, L})$ to a next one of the convolutional LSTM layers 512. A last one of the convolutional LSTM layers 512 of the encoder section 504 provides the output $d_k$, L to a first one of the convolutional LSTM layers 512 of the decoder section 508. Each of the convolutional LSTM layers 512 of the decoder section 508 provides an output $(d_{k-1, L+1} \ldots d_{k-1, 2L-1})$ to a next one of the convolutional LSTM layers 512. Each of the convolutional LSTM layers 512 further receives a respective previous state $(s_{k-2, 1} \ldots s_{k-2, 2L})$ and previous output $(d_{k-2, 1} \ldots d_{k-2, 2L})$ of the convolutional LSTM layer 512. A last one of the convolutional LSTM layers 512 provides an output $d_{k-1, 2L}$ corresponding to predicted sensor data $D'_k$. The predicted sensor data $D'_k$ corresponds to a predicted frame of sensor data subsequent to the frame including the sensor data $D_{k-1}$.

The sensor data prediction module 400 may include a loss function module 516. The loss function module 516 receives and compares the predicted sensor data $D'_k$ and an actual current frame of the sensor data $D_k$. The loss function module 516 outputs a result of the comparison of (e.g., a difference or distance between) the predicted sensor data $D'_k$ and the actual current frame of the sensor data $D_k$. For example, the output of the loss function module 516 may correspond to a mean square error between the predicted sensor data $D'_k$ and the actual current frame of the sensor data $D_k$. For example only, the output of the loss function module 516 may indicate a loss L in accordance with L=mean $(\|D'_k - D_k\|_2^2)$. The output of the loss function module 516 may be used to train the convolutional LSTM network 500.

Figure 6:
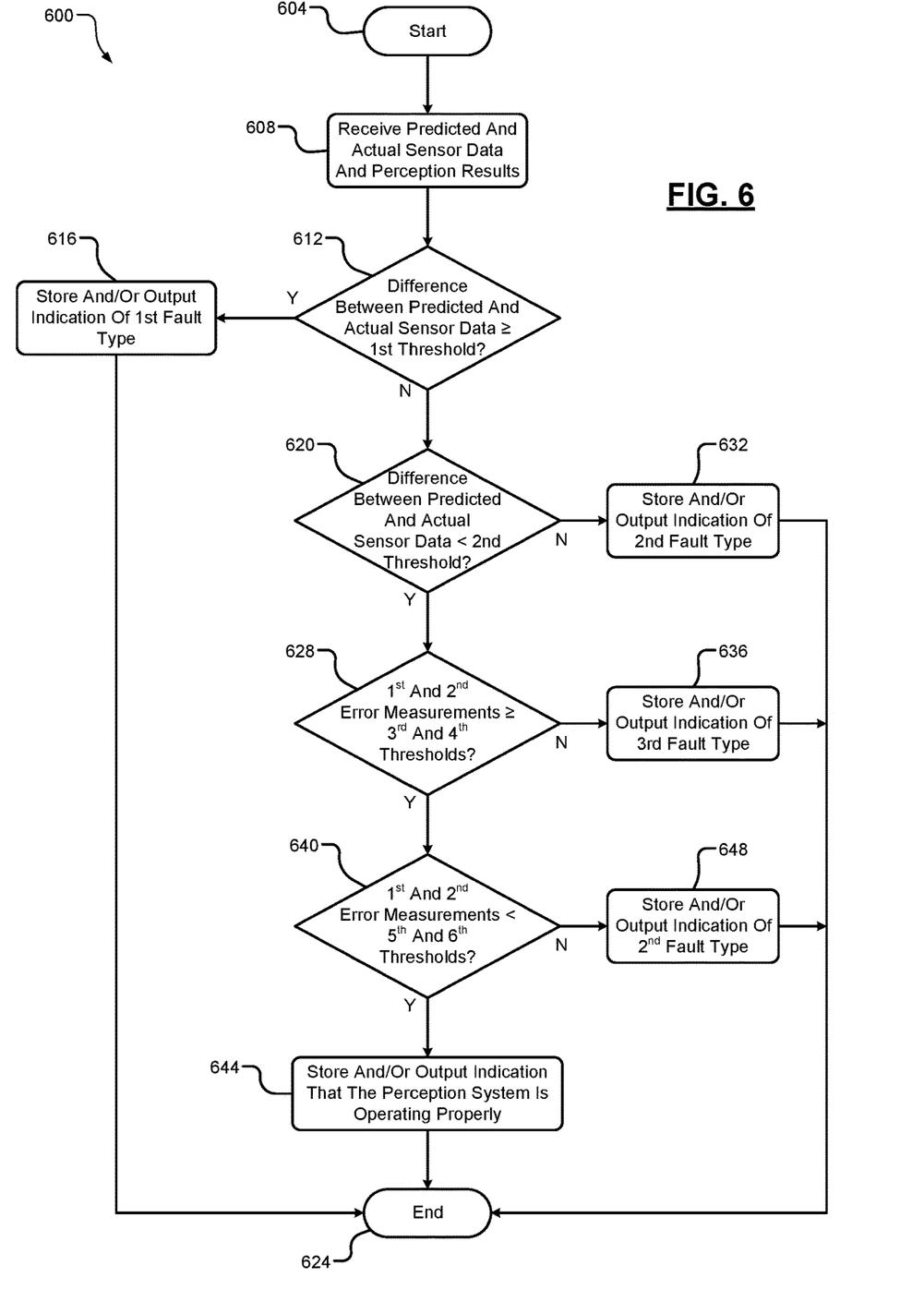
FIG. 6 illustrates steps of an example method of diagnosing faults associated with a perception system of a vehicle.

Referring now to FIG. 6, an example method 600 of diagnosing faults associated with the perception system of a vehicle begins at 604. For example, the method 600 is implemented using the prediction module 304 and the diagnostic module 308 as described above. At 608, the method 600 (e.g., the diagnostic module 308) receives the predicted sensor data (e.g., $D'_k$ and perception results (e.g., $R'_k$) and the actual sensor data (e.g., $D_k$) and perception results (e.g., $R_k$). At 612, the method 600 (e.g., the diagnostic module 308) determines whether a difference (e.g., $\Delta_{d, k}$) between the predicted sensor data $D'_k$ and the actual sensor data $D_k$ is greater than or equal to a first threshold. If true, the method 600 continues to 616. If false, the method 600 continues to 620. At 616, the method 600 (e.g., the diagnostic module 308) stores and/or outputs an indication that a first fault type has been detected in the perception system. For example, the first fault type indicates that a sensor associated with the sensor data is faulty. The method 600 then ends at 624.

At 620, the method 600 (e.g., the diagnostic module 308) determines whether the difference between the predicted sensor data $D'_k$ and the actual sensor data $D_k$ is less than a second threshold that is less than the first threshold. If true, the method 600 continues to 628. If false, the method 600 continues to 632. At 632, the method 600 (e.g., the diagnostic module 308) stores and/or outputs an indication that a second fault type has been detected in the perception system. For example, the second fault type indicates that, while the sensor may not be faulty, the sensor data results may not be as accurate as desired. In other words, while the difference between the predicted sensor data $D'_k$ and the actual sensor data $D_k$ not greater than or equal to the first threshold, the difference is still greater than desired. The method 600 then ends at 624.

At 628, the method 600 (e.g., the diagnostic module 300) determines whether (i) a first error measurement of the predicted perception results $R'_k$ is greater than or equal to a third threshold and (ii) a second error measurement of the predicted perception results $R'_k$ is greater than or equal to a fourth threshold. For example, the first and second error measurements may be based on a comparison between the predicted perception results $R'_k$ and the actual perception results $R_k$. In one example, the first error measurement corresponds to a false positive rate (i.e., a rate of detection of objects indicated in the predicted perception results $R'_k$ that are not detected in the actual perception results $R_k$). Conversely, the second error measurement corresponds to a false negative rate (i.e., a rate of objects not detected in the predicted perception results $R'_k$ relative to objects detected in the actual perception results $R_k$). If either of (i) and (ii) is true, the method 600 continues to 636. If neither of (i) and (ii) is true, the method 600 continues to 640.

At 636, the method 600 (e.g., the diagnostic module 308) stores and/or outputs an indication that a third fault type has been detected in the perception system. For example, the third fault type indicates that there is a fault in the calculation of the perception results (e.g., software associated with the feature extraction module 332 and/or the object module 340 is faulty). The method 600 then ends at 624.

At 640, the method 600 (e.g., the diagnostic module 300) determines whether (i) the first error measurement is less than a fifth threshold that is less than the third threshold and (ii) the second error measurement is less than a sixth threshold that is less than the fourth threshold. If both of (i) and (ii) are true, the method 600 continues to 644. If either of (i) and (ii) is not true, the method 600 continues to 648.

At 648, the method 600 (e.g., the diagnostic module 308) stores and/or outputs an indication that the second fault type has been detected in the perception system. For example, the second fault type indicates that, while the sensor may not be faulty and the perception results are relatively accurate, the perception results may not be as accurate as desired. The method 600 then ends at 624.

At 644, the method 600 (e.g., the diagnostic module 308) stores and/or outputs an indication that the perception system does not have any faults and the prediction and perception results are accurate and then ends at 624.

In some examples, the method 600 may include one or more fault mitigation steps in response to determining that the perception system has a fault. For example, the method 600 may include alerting the driver, disengaging autonomous vehicle control, pulling the vehicle over, continuing to operate without using sensors indicated as faulty, etc. In other words, since the perception system depends upon receiving accurate information from the sensors and perception results, detecting a fault in one or more of the sensors and/or the calculation of perception results may indicate that fault mitigation is necessary. Accordingly, fault mitigation may include one or more steps to either limit or terminate the ability of the perception system to control the vehicle and return control to the driver.

The method 600 may be performed continuously, periodically (e.g., a predetermined amount of time subsequent to powering on the vehicle), and/or conditionally, such as in response to the vehicle being in a predetermined location (e.g., each time the vehicle is passes through a particular intersection, passes near a predetermined building or structure, etc.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A perception system for a vehicle, comprising:
    a perception circuit configured to capture a first sensor measurement, wherein the first sensor measurement includes data directly received from a first sensor captured in a first period,
    the first sensor being a camera of the vehicle;
    a prediction circuit configured to:
        (i) receive the first sensor measurement captured in the first period,
        (ii) prior to capturing a second sensor measurement in a second period subsequent to the first period using the first sensor, generate a predicted sensor measurement from the first sensor for the second period using the first sensor measurement,
        (iii) in the second period, directly receive the second sensor measurement captured by the first sensor in the second period, and
        (iv) output results of a comparison between the predicted sensor measurement and the second sensor measurement, wherein the results include a mathematical difference involving a subtraction operation between the predicted sensor measurement and the second sensor measurement;
    a diagnostic circuit configured to selectively identify a fault in the perception system based on the mathematical difference between the predicted sensor measurement and the second sensor measurement; and
    at least one of:
        an engine control module configured to control torque output of an engine based on input from the perception circuit;
        a power inverter module configured to control power flow to and from an electric motor based on the input from the perception circuit;
        a braking control module configured to adjust braking of the vehicle based on the input from the perception circuit; and
        a steering control module configured to adjust steering based on the input from the perception circuit.

2. The perception system of claim 1, wherein the first sensor measurement further includes historical sensor measurements captured in periods prior to the first period.

3. The perception system of claim 2, wherein the prediction circuit is configured to generate the predicted sensor measurement further based on the historical sensor measurements.

4. The perception system of cairn , wherein the prediction circuit includes a convolutional long short term memory network.

5. The perception system of claim 1, wherein the perception circuit is further configured to generate perception results based on the second sensor measurement, wherein the perception results include labeled objects and locations.

6. The perception system of claim 5, wherein the prediction circuit is configured to generate predicted perception results corresponding to the predicted sensor measurement.

7. The perception system of claim 6, wherein the prediction circuit is configured to (i) compare the predicted perception results to the perception results and (ii) provide results of the comparison between the predicted perception results and the perception results to the diagnostic circuit.

8. The perception system of claim 7, wherein the diagnostic circuit is configured to selectively identify the fault in the perception system further based on the results of the comparison between the predicted perception results and the perception results.

9. The perception system of claim 1, wherein the fault corresponds to a fault in the first sensor.

10. A method of operating a perception system for a vehicle, the method comprising:
    capturing a first sensor measurement, wherein the first sensor measurement includes data directly received from a first sensor captured in a first period, wherein the first sensor is a camera of the vehicle;
    prior to capturing a second sensor measurement in a second period subsequent to the first period using the first sensor, generating, a predicted sensor measurement from the first sensor for the second period using the first sensor measurement;
    in the second period, directly receiving the second sensor measurement captured by the first sensor in the second period;
    outputting results of a comparison between the predicted sensor measurement and the second sensor measurement, wherein the results include a mathematical difference involving a subtraction operation between the predicted sensor measurement and the second sensor measurement;
    selectively identifying a fault in the perception system based on the mathematical difference between the predicted sensor measurement and the second sensor measurement; and
    at least one of:
        controlling torque output of an engine based on input from the perception system;
        controlling power flow to and from an electric motor based on the input from the perception system;
        adjusting braking of the vehicle based on the input from the perception system; and
        adjusting steering based on the input from the perception system.

11. The method of claim 10, wherein the first sensor measurement further includes historical sensor measurements captured in periods prior to the first period.

12. The method of claim 11, further comprising generating the predicted sensor measurement further based on the historical sensor measurements.

13. The method of claim 10, further comprising generating the predicted sensor measurement using a convolutional long short term memory network.

14. The method of claim 10, further comprising generating perception results based on the second sensor measurement, wherein the perception results include labeled objects and locations.

15. The method of claim 14, further comprising generating predicted perception results corresponding to the predicted sensor measurement.

16. The method of claim 15, further comprising comparing the predicted perception results to the perception results and selectively identifying the fault in the perception system further based on the results of the comparison between the predicted perception results and the perception results.

17. The method of claim 10, wherein the fault corresponds to a fault in the first sensor.

18. A perception system for a vehicle, the perception system comprising:
  a first sensor arranged to provide data corresponding to an environment surrounding the vehicle, wherein the first sensor is a camera;
  a perception circuit configured to
    capture a first sensor measurement, wherein the first sensor measurement includes data directly captured from the first sensor in a first period,
    capture a second sensor measurement, wherein the second sensor measurement includes data directly captured from the first sensor in a second period subsequent to the first period, and
    generate perception results based on the second sensor measurement, wherein the perception results include labeled objects and locations;
  a prediction circuit configured to (i) receive the first sensor measurement captured in the first period, the second sensor measurement captured in the second period, and the perception results, (ii) generate a predicted sensor measurement from the first sensor for the second period, (iii) generate, based on the predicted sensor measurement, predicted perception results, and (iv) output results of a first comparison between the predicted sensor measurement and the second sensor measurement and a second comparison between the predicted perception results and the perception results, wherein the results include a mathematical difference involving a subtraction operation between the predicted sensor measurement and the second sensor measurement;
  a diagnostic circuit configured to selectively identify a fault in the perception system based on the results of the first comparison, the second comparison, and the mathematical difference; and
  at least one of:
    an engine control module configured to control torque output of an engine based on input from the perception circuit;
    a power inverter module configured to control power flow to and from an electric motor based on the input from the perception circuit;
    a braking control module configured to adjust braking of the vehicle based on the input from the perception circuit; and
    a steering control module configured to adjust steering based on the input from the perception circuit.

* * * * *